April 10, 1956 W. L. HARRISON 2,741,061
FISH HOLDING DEVICE
Filed July 13, 1954 2 Sheets-Sheet 1
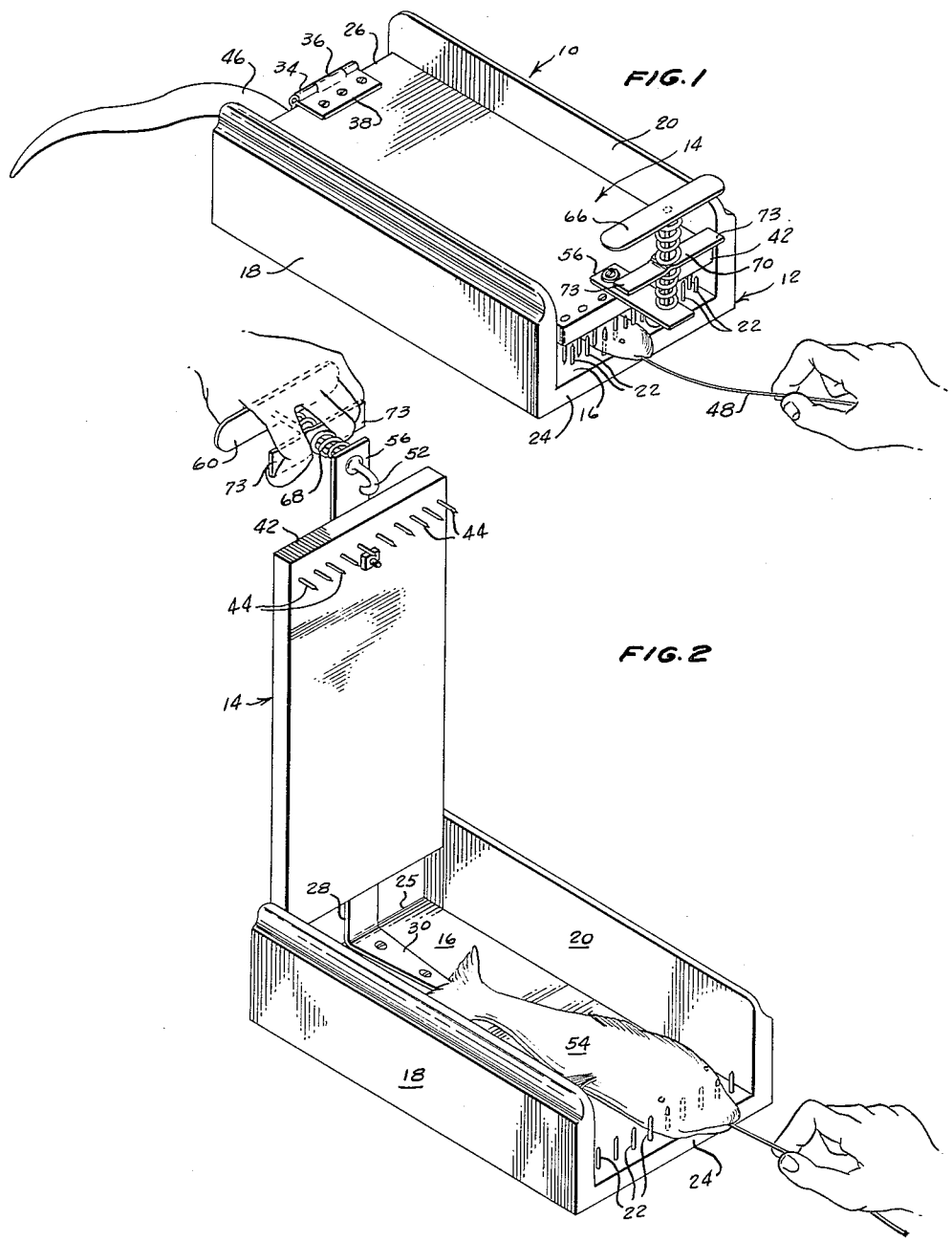
INVENTOR.
WILLIAM L. HARRISON
BY
McMorrow, Berman + Davidson
ATTORNEYS April 10, 1956   W. L. HARRISON   2,741,061
FISH HOLDING DEVICE
Filed July 13, 1954   2 Sheets-Sheet 2
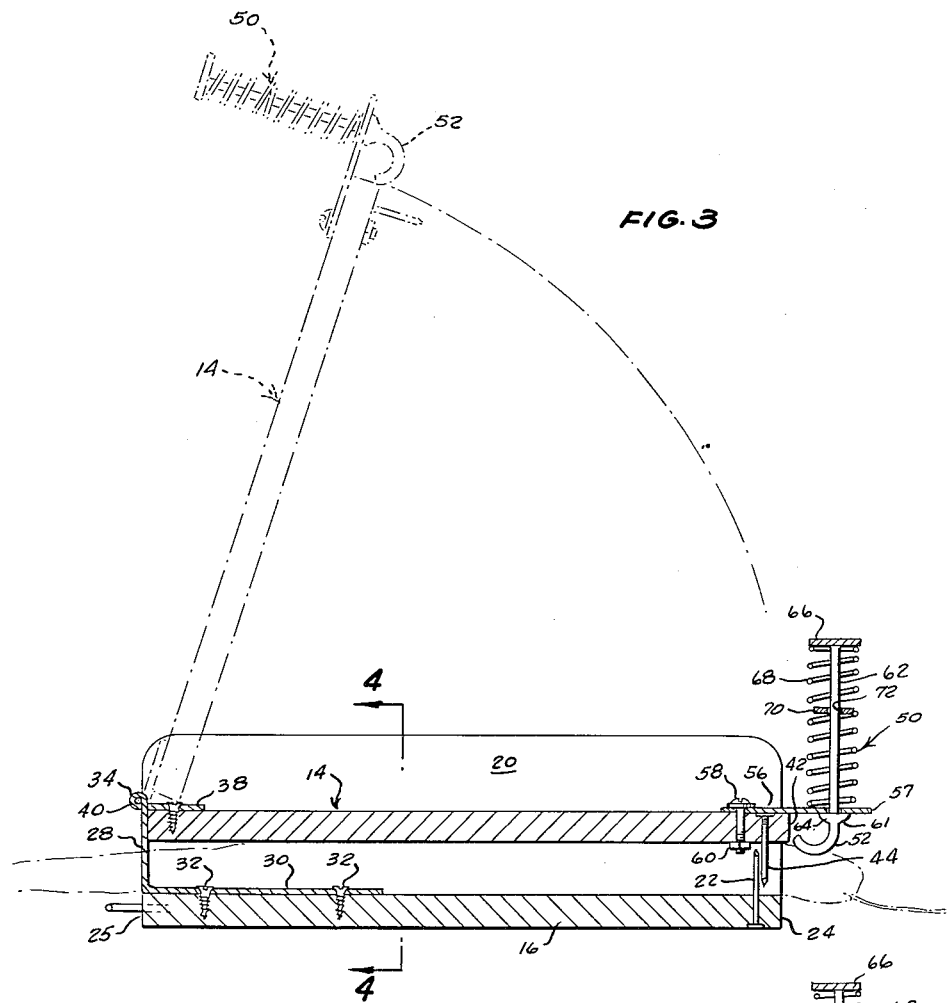
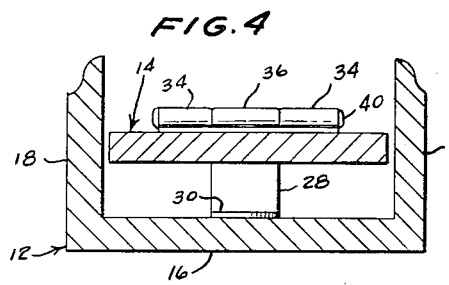
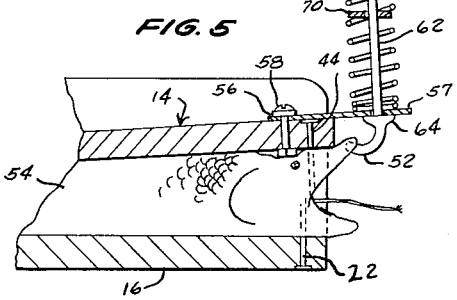
INVENTOR.
WILLIAM L. HARRISON
BY
McMorrow, Berman & Davidson
ATTORNEYS United States Patent Office 2,741,061
Patented Apr. 10, 1956

2,741,061

FISH HOLDING DEVICE

William L. Harrison, Lottsburg, Va.

Application July 13, 1954, Serial No. 442,959

1 Claim. (Cl. 43—53.5)

This invention relates to fishing apparatus and more particularly to a device for securely holding fish.

It is an object of this invention to provide a fish holding apparatus to be employed in removing a fishing hook from a fish held in the device.

Certain types of undesirable fish, such as, for example, toad-fish, are obnoxious and difficult to handle with the hands and also it is difficult to remove a fishing hook upon which the toad-fish may be caught without the use of mechanical tools. Still other types of fish are dangerous to handle, such as catfish, without risk of injury to the hands in retrieving the hook. Other types of fish such, for example, as eels are often hooked. Most fishermen do not desire to keep eels since they are considered to be undesirable for food by a majority of people. Further, eels are notorious for twisting and tangling the fishing line as they are reeled in or pulled in and considerable difficulty is usually encountered in removing the hook without placing the hands on the eel. It is a difficult feat to hold an eel in the hands to remove a hook upon which the eel is caught. In fact, many fishermen cut the fishing line above the hook, thereby losing the hook and leader, rather than attempt the difficult task of holding the eel and attempting to remove the hook either by hand or with the aid of pliers or similar tools.

Hence, it is a further object of this invention to provide an apparatus wherein the undesirable fish caught upon a fisherman's hook may be securely held, and the apparatus being provided with means to assist the fisherman in retrieving the hook from the mouth of the undesirable fish without the use of his hands in holding the fish while attempting to remove the hook.

Another and still further object of this invention is to provide a fish holding device to assist a fisherman in removing a fishing hook from an undesirable species of fish, which is simple in operation, compact in size, constructed of simple yet durable materials of relatively low cost, and which will be capable of repeated usage over an extended period of time.

Other objects and advantages will become apparent from a consideration of the following detailed description, forming the specification, and taken in conjunction with the accompanying drawings, in which:

Figure 1 is a perspective view of the fish holding device embodying this invention shown in its closed position and securely holding an eel therein;

Figure 2 is a perspective view similar to Figure 1 but showing the device in its open position and accommodating a different species of undesirable fish therein prior to removal of a fishing hook;

Figure 3 is a vertical cross sectional view taken longitudinally through the device as shown in Figure 1;

Figure 4 is a vertical transverse cross sectional view taken on line 4—4 of Figure 3; and Figure 5 is a fragmentary longitudinal cross sectional view showing the forward end of the device with the mouth clamp engaged in the mouth of a fish held in the device to assist in the removal of a fishing hook.

With continued reference to the drawings, the fish holding device of this invention is generally indicated at 10 and comprises a body, generally indicated at 12, of generally U-shaped cross section and a lid, generally indicated at 14 carried by the body 12 for movement in a vertical arcuate path about a horizontal axis.

The body 12 includes a base 16 and a pair of spaced side walls 18 and 20 upstandingly disposed along opposite longitudinal sides of the base 16 and perpendicular thereto, the base 16 and side walls 18 and 20 being preferably formed integrally so that the body 12 may be made of one piece. However, it is quite apparent that the side walls 18 and 20 may be separate pieces secured to the base in any suitable manner.

A transversely spaced row of upstanding spikes 22 are disposed adjacent one end 24 of the base 16; this end may be referred to as the forward end of the device.

The lid 14 is disposed between the side walls 18 and 20 and pivotally secured adjacent one end 26, remote from the end 24 of the base 16, to the upper end of an upstanding leg 28 of a hinge plate 30 secured upon the upper surface of the base 16 as by screws 32. Thus, it will be seen that the leg 28 extends upwardly from the rear or back end 25 of the base 16 and carrying at its upper end a hinge barrel 34 which together with the hinge barrel 36 of the hinge plate 38 secured to and carried by the upper surface of the lid 14 provides a passage for a hinge pin 40 therethrough to thus mount the lid for movement in a vertical arcuate path about a horizontal axis defined by the center line of the hinge pin 40, the axis about which the lid 14 moves being spaced above the base 16 and lying in a plane parallel thereto.

The end 42 of the lid 14 will extend slightly beyond the end 24 of the base 16, as clearly shown in Figure 3. Adjacent the end 42, the lid carries a row of transversely spaced spikes 44 extending thereacross.

Thus, in use, an eel 46 which may have been caught upon the hook of a fishing line 48 may be placed on the base 16 of the body 12 in the manner shown in Figures 1 and 3 while the lid is in the raised position shown in broken lines in Figure 3. The body of the eel adjacent its head will be impaled upon the row of spikes 22 with the head extending outwardly from the end 24 of the base. The lid 14 will then be moved in its vertical arcuate path so that the row of spikes 44 will be brought into impaling relation with the eel, with the individual spikes in the row being staggered with relation to the individual spikes in the row of spikes 22 and the rows of spikes being spaced from each other, as clearly shown in Figures 3 and 5.

Thus, it will be seen that the base 16 defines, in effect, one jaw while the lid 14 defines a cooperating jaw capable of movement in a vertical arcuate path toward and away from the one end 24 of the jaw or base 16.

With the eel 46 thus held in the device 10, it will be possible for the fisherman to extract the hook on the line 48 without the necessity of holding the eel in his bare hands.

In addition, and especially as shown in Figure 5, there is provided a mouth clamp, generally indicated at 50 provided with a hook 52 adapted to engage the upper jaw of a fish 54 and maintain the mouth in an open position to facilitate the removal of a fishing hook from the fish.

The mouth clamp 50 is fixedly carried by the jaw or lid 14, and specifically, the mouth clamp comprises an elongated rectangular support plate 56 secured adjacent one end to the jaw as by a bolt 58 passing through suitably aligned openings in the plate 56 and the jaw 14 adjacent the end 42 of the jaw or lid 14, and secured by the usual nut 60. The support plate 56 extends longitudinally of the lid or jaw 14 and outwardly therefrom so that the end of the plate 56 remote from the end secured by the bolt 58 is disposed outwardly of the end 42 of the lid.

An opening 62 is provided in the plate 56 adjacent its end 57 remote from the end secured to the lid or jaw 14, to slidably receive therethrough a hook rod 62 the lower end of which carries the hook 52. The rod 62 is provided with an enlarged annular portion 64 which has an upper flat face adapted to engage the under or lower surface of the plate 56 to prevent movement of the hook 52 upwardly through the opening 61. A cross bar 66 is carried centrally intermediate its ends upon the upper terminal end of the rod 62 and extends perpendicularly thereto. A coil spring 68 surrounds the rod 62 and is seated at one end against the cross bar 66 and at its other end against the upper surface of the plate 56 to normally urge the enlarged portion or stop 64 into engagement with the support plate 56. A second cross bar 70 is provided centrally intermediate its ends with an opening 72 transversely therethrough so as to be slidably receivable about the rod 62 with the oppositely extending arms 73 of the cross bar passing through adjacent spaces in the spirals of the coil spring 68. Thus, the cross bar 70 is selectively adjustable longitudinally of the rod 62 by rotating the rod so as to be guided upwardly or downwardly along the coils of the spring 68.

In addition to providing a finger support for the hand of the user, as indicated in Figure 2, the cross bar 70 also defines a tension adjusting means for the spring 68 since by selectively moving the cross bar 70 longitudinally of the rod 62, the tension on the spring 68 will be varied so that more or less resilient pressure will be required to depress the rod 62 against the resilience or effort of the spring 68 so as to move the hook 52 away from the support plate 56. Likewise, the resilience with which the hook 52 will be urged into contact with the support plate 56 may be selectively adjusted by rotation of the cross bar 70 so as to move it longitudinally of the rod 52 and guide it by the coils of the spring 68.

Hence, as shown in Figure 5, the hook 52 may be depressed by the hand of the user pressing the rod 62 downwardly against the effort of the spring 68 and hooking the hook 52 in the upper jaw of the fish 54, and then releasing the manual pressure on the rod 62 to permit the spring 68 to move the rod upwardly and consequently, the hook 52 will be carried upwardly therewith and maintain the mouth of the fish open so as to facilitate the removal of a fishing hook therefrom.

From the foregoing, it will be apparent that there has been provided a fish holding device for facilitating the removal of the fishing hook from the mouth of the fish, the device 10 comprising a body 12 having a base 16 defining one jaw and a pair of spaced upstanding side walls 18 and 20, a transverse row of spikes 22 carried by the one jaw 16 adjacent one end 24 thereof for impaling a fish thereon, a lid 14 defining a cooperating jaw carried by the fixed jaw for movement in a vertical arcuate path toward and away from the one end 24 of the one jaw about a horizontal axis defined by the center line of the pivot pin 40 spaced above the fixed jaw 16 and between the side walls 18 and 20, a transverse row of spikes 44 carried by the movable jaw 14 adapted to impale the fish on the row of spikes 22 upon movement of the cooperating jaw 14 in its arcuate path between the side walls 18 and 20 toward the end 24 of the one jaw for securely holding the fish to facilitate extractiton of a fishing hook from the mouth of the fish.

While there are shown and described the preferred embodiment of the invention, it is to be understood that the structure is susceptible to change and modification within the practicability of the invention and therefore should be limited only by the scope of the claim appended hereto.

What is claimed is:

A fish holding device for facilitating the removal of a fishing hook from the mouth of a fish, said device comprising a body designed to rest on a base and defining one jaw and a pair of spaced upstanding side walls, a transverse row of spikes carried by said one jaw adjacent one end thereof for impaling a fish thereon, a lid defining a cooperating jaw carried by said one jaw for movement in a vertical arcuate path toward and away from said one end of said one jaw about a horizontal axis spaced above said one jaw and between said side walls, a transverse row of spikes carried by said cooperating jaw adapted to impale the fish adjacent its head on said first mentioned row of spikes when the fish lies longitudinally of the base between said side walls and said jaws, and when said cooperating jaw is moved in its arcuate path toward said one end of the one jaw for securely holding the fish to facilitate extraction of a fishing hook from the mouth of the fish, and a hook carried by said jaw for movement in a rectilinear path perpendicular thereto, said hook being disposed outwardly of said jaws and being directed toward the cooperating jaw, and spring means urging said hook in a direction away from said one jaw whereby said hook is adapted to engage and maintain the mouth of the fish held in said device in an open position.

References Cited in the file of this patent

UNITED STATES PATENTS

| | | |
|---|---|---|
| 1,353,981 | Bahde | Sept. 28, 1920 |
| 2,263,965 | Fiori | Nov. 25, 1941 |
| 2,523,736 | Swetlik | Sept. 26, 1950 |
| 2,586,732 | Sohier | Feb. 19, 1952 |
| 2,603,829 | Siskoff | July 22, 1952 |